Oct. 31, 1944. D. A. WHITSON 2,361,581
METHOD OF AND APPARATUS FOR REPRODUCING SOUND
Filed Aug. 16, 1920
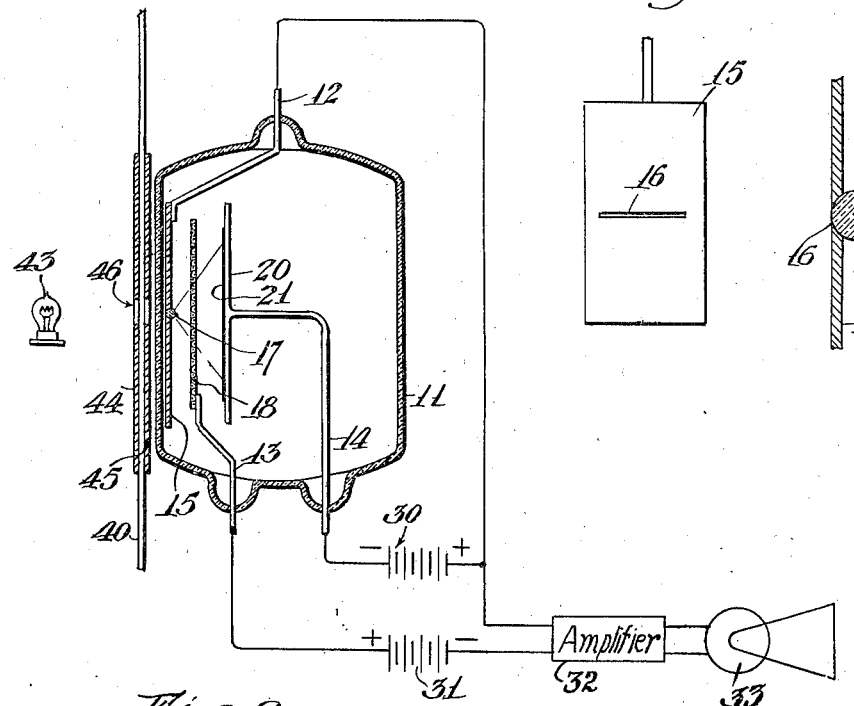

Patented Oct. 31, 1944

2,361,581

UNITED STATES PATENT OFFICE 2,361,581

METHOD OF AND APPARATUS FOR REPRODUCING SOUND

Delmar A. Whitson, Los Angeles, Calif., assignor to Whitson Photophone Corporation, a corporation of Nevada Application August 16, 1920, Serial No. 403,709

1 Claim. (Cl. 179—100.3)

My invention relates to the reproduction of sound from a photographic record.

The object of the present invention is to provide means for reproducing sound from a record of this character.

Further objects and advantages will be made evident hereinafter.

In the drawing which is for illustrative purposes only,

Fig. 1 is a diagrammatic section thru one form of my invention.

Fig. 2 is a view showing the sound record and the gates therefor.

Fig. 3 is a view with a distributing sheet.

Fig. 4 is an enlarged section thru said sheet showing the type of cylindrical lens used.

Fig. 5 is a view of the grid.

Fig. 6 is a view of the plate.

In the embodiment of my invention shown, 11 is a tube preferably made of quartz glass and filled with an inert gas such as argon or neon. Sealed in the walls of the tube 11 are three terminals 12, 13 and 14. Carried on the terminal 12 is a metallic sheet 15 having a slot 16 in which a cylindrical lens 17 is placed, this lens entirely filling the slot 16 and tending to disperse in a fan shaped form any rays of light passing through this slot. Secured on the terminal 13 is a grid 18 preferably formed of wire and secured on the terminal 14 is a plate 20 which has upon its face a coating 21 of photo-electric material. By photo-electric material I mean a substance such as rubidium which has the capability of ionizing the space adjacent thereto upon being illuminated by a light or violet ray source of illumination. An exciter battery 30 is connected between the terminals 12 and 14 and an intoning battery has one terminal connected to the terminal 13, the other terminal being connected into an audion amplifier 32 which is connected to the terminal 12. The amplifier 32 is connected to some sort of a sound reproducer, such as a loud speaker, 33. The sound record shown at 40 in Fig. 1 and Fig. 2 is preferably a piece of motion picture film, having a band 41 composed of lines which represent the sound record, these lines being of varying density so they will pass more or less light. A source of illumination 43 is provided, the film 41 passing through gates 44 and 45 having slots 46 which are adjacent to the slot 16.

The method of operation of my invention is as follows:

The film 40 is passed between the gates 44 and 45 at a constant rate of speed. The light from the luminous source 43 passes through the openings 46 and through the film 40 carried therebetween, the light then passing through the walls of the tube 11 and through the slot 16 where it it spread into a wedge shaped ray which impinges upon the photo-electric substance 21 on the plate 20. The exciter battery 30 sets up an electric field between the plate 20 and the sheet 15, this field having a certain resistance which governs the amount of current which may pass between the grid 18 and the plate or cathode 20. Whenever a light or actinic ray falls upon the photo-electric substance 21, the substance emits electrons, causing the space between the grid 18 and the plate 20 to be ionized thus changing the resistance of this space and allowing more or less current to flow through the amplifier 32 which is in series with this space and with the intoning battery 31. These electrons are attracted to grid 18, some of them passing through the interstices of the grid and striking the sheet or anode 15. This causes secondary emission from anode 15, these secondary electrons being attracted to grid 18 due to the positive bias on the grid. The amount of this ionizing is proportional to the intensity of the illumination and this intensity of the illumination is in turn proportional to the light rays which produce the markings 41 on the film. As a result the amplifier delivers current to the loud speaker 33 which reproduces accurately the sound originally recorded on the film 40.

I claim as my invention:

An apparatus for reproducing sound comprising a film printed with transverse bands proportional to the sound to be reproduced; a closed quartz tube containing an inert gas; a metallic plate in said tube; a metallic sheet in said tube parallel to said plate; a metallic grid between said plate and said sheet; an exciting source of electricity connected to impress an electromotive force between said plate and said sheet; an intoner having one terminal connected to said plate; an intoning source of electricity connected between the other terminal of said intoner and said grid; a layer of photo-electric material on said plate on the side towards said sheet; a cylindrical lens mounted in a slot in said sheet; a shield outside said tube having a slot adjacent to said lens, said slot being covered by said film; and a luminous source so placed as to shine through said film, said slot and said lens on said photo-electric material.

DELMAR A. WHITSON.